United States Patent
Kwon

(10) Patent No.: US 10,234,655 B2
(45) Date of Patent: Mar. 19, 2019

(54) IMAGING LENS

(71) Applicant: LG INNOTEK CO., LTD., Seoul (KR)

(72) Inventor: Dukkeun Kwon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 233 days.

(21) Appl. No.: 15/247,375

(22) Filed: Aug. 25, 2016

(65) Prior Publication Data
US 2016/0363741 A1 Dec. 15, 2016

Related U.S. Application Data

(63) Continuation of application No. 14/747,620, filed on Jun. 23, 2015, now Pat. No. 9,451,140, which is a continuation of application No. 13/935,218, filed on Jul. 3, 2013, now Pat. No. 9,091,842, which is a (Continued)

(30) Foreign Application Priority Data

Aug. 11, 2009 (KR) .................. 10-2009-0073715

(51) Int. Cl.
G02B 9/60 (2006.01)
G02B 13/00 (2006.01)
G02B 13/18 (2006.01)
H04N 5/225 (2006.01)
G02B 5/00 (2006.01)
G02B 5/20 (2006.01)
G02B 27/00 (2006.01)

(52) U.S. Cl.
CPC ......... *G02B 13/0045* (2013.01); *G02B 5/005* (2013.01); *G02B 5/208* (2013.01); *G02B 9/60* (2013.01); *G02B 13/18* (2013.01); *G02B 27/0025* (2013.01); *H04N 5/2254* (2013.01)

(58) Field of Classification Search
CPC ....... G02B 13/18; G02B 13/0045; G02B 9/60
See application file for complete search history.

(56) References Cited

U.S. PATENT DOCUMENTS

| 3,871,749 A | 3/1975 | Harada |
| 5,299,064 A | 3/1994 | Hamano et al. |
| 6,259,508 B1 | 7/2001 | Shigematsu |

(Continued)

FOREIGN PATENT DOCUMENTS

JP 201166207 A 6/2001

OTHER PUBLICATIONS

Office Action dated Jun. 26, 2012 in U.S. Appl. No. 12/854,428.
(Continued)

*Primary Examiner* — Joseph P Martinez
(74) *Attorney, Agent, or Firm* — Saliwanchik, Lloyd & Eisenschenk

(57) ABSTRACT

Disclosed herein is an imaging lens suitable for a camera module using a high resolution imaging sensor, decreasing a flare phenomenon and reducing the sensitivity. The imaging lens comprises, orderly from the object side, a first lens having positive (+) refractive force; a second lens having negative (−) refractive force; a third lens having positive (+) refractive force; a fourth lens having positive (+) refractive force; and a fifth lens having negative (−) refractive force, wherein an object side plane of the third lens is convexly formed.

20 Claims, 7 Drawing Sheets

Related U.S. Application Data continuation of application No. 12/854,428, filed on Aug. 11, 2010, now Pat. No. 8,503,111.

(56) References Cited

U.S. PATENT DOCUMENTS

| | | | |
|---|---|---|---|
| 7,826,151 B2 | 11/2010 | Tsai | |
| 9,091,842 B2 | 7/2015 | Kwon | |
| 2009/0122423 A1* | 5/2009 | Park | G02B 9/34 |
| | | | 359/764 |
| 2010/0254029 A1* | 10/2010 | Shinohara | G02B 9/60 |
| | | | 359/764 |

OTHER PUBLICATIONS

Office Action dated Dec. 10, 2012 in U.S. Appl. No. 12/854,428.
Office Action dated Jun. 3, 2014 in U.S. Appl. No. 13/935,218.
Office Action dated Aug. 3, 2015 in Korean Application No. 10-2009-0073715.
Office Action dated Feb. 12, 2016 in U.S. Appl. No. 14/747,620.

* cited by examiner

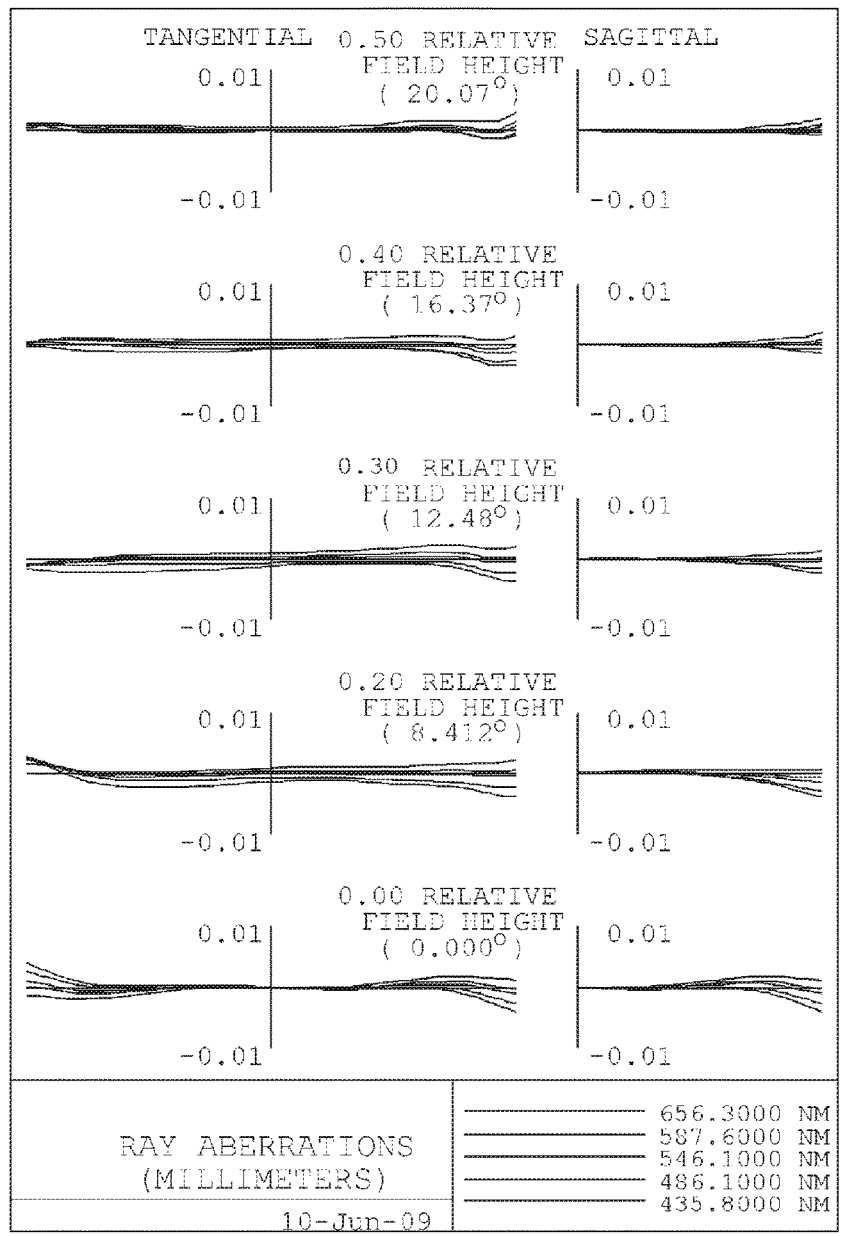

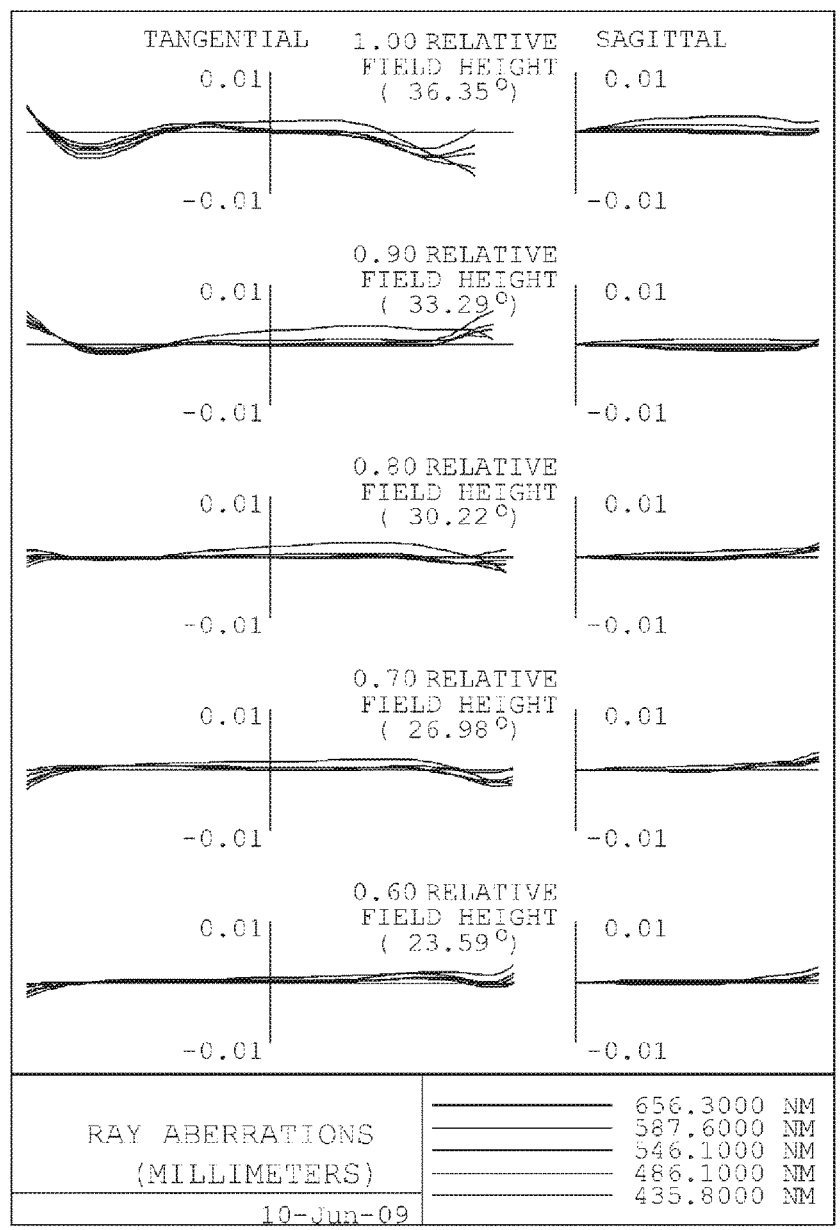

FIG. 5(a)
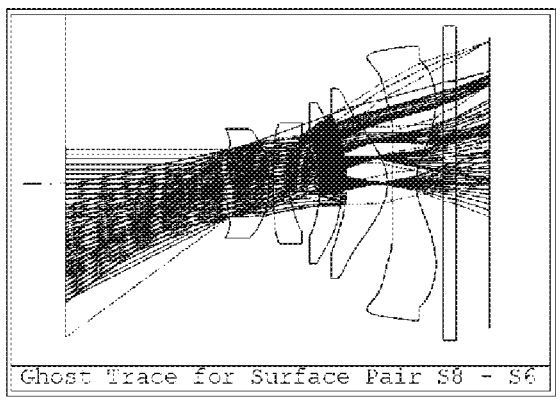
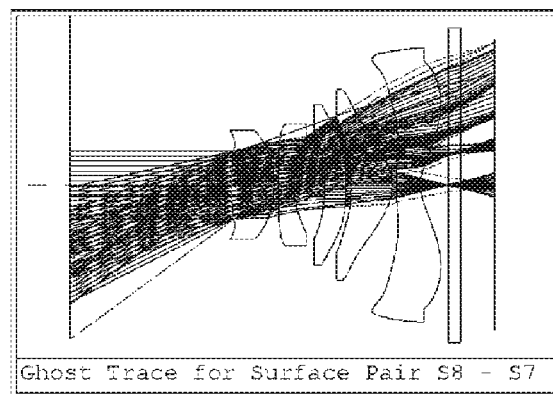
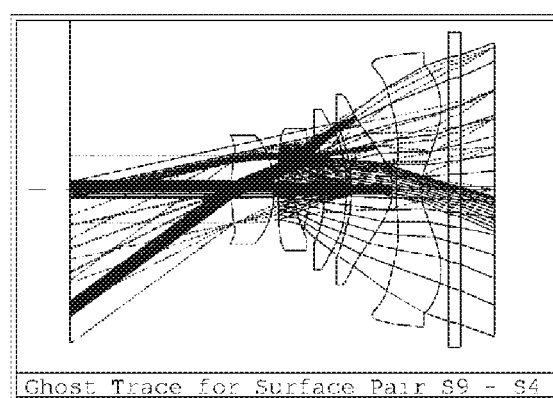

FIG. 5(b)
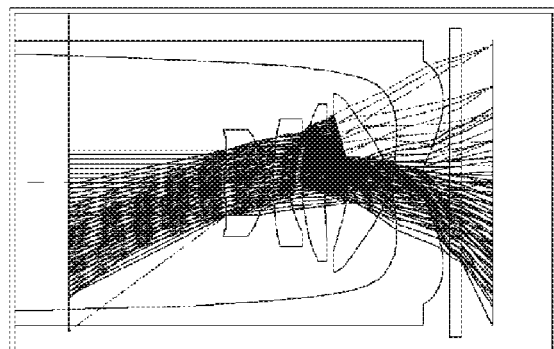
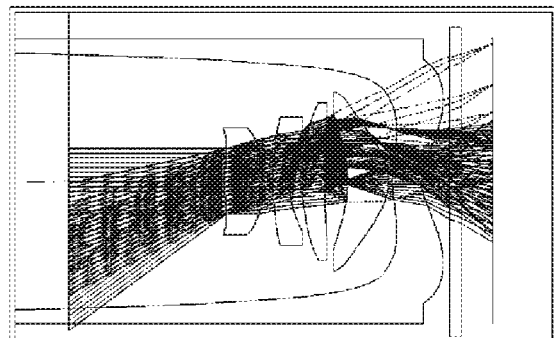
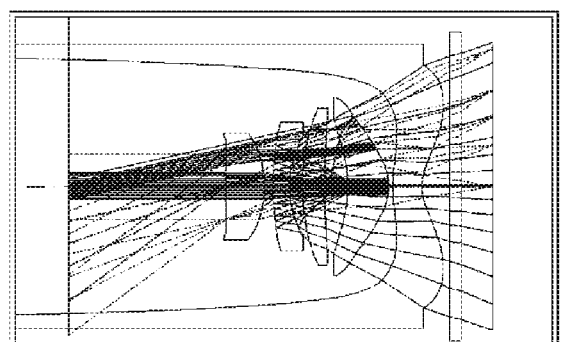

IMAGING LENS

CROSS-REFERENCE TO RELATED APPLICATIONS

This application is a continuation of U.S. application Ser. No. 14/747,620, filed Jun. 23, 2015; which is a continuation of U.S. application Ser. No. 13/935,218, filed Jul. 3, 2013, now U.S. Pat. No. 9,091,842, issued Jul. 28, 2015; which is a continuation of U.S. application Ser. No. 12/854,428, filed Aug. 11, 2010, now U.S. Pat. No. 8,503,111, issued Aug. 6, 2013; which claims the benefit under 35 U.S.C. § 119 of Korean Application No. 10-2009-0073715, filed on Aug. 11, 2009, which are hereby incorporated by reference in their entirety.

BACKGROUND

Field of the Invention

The present invention relates to an imaging lens.

Description of the Related Art

Regarding an image pick-up system; there have been recent researches into mobile terminal used camera modules, DSCs (Digital Still Camera), camcorders, PC cameras (imaging lens attached personal computers), etc. The most important component to obtain an image for such an image pick-up system-related camera module is an imaging lens that produces images.

Attempts to construct an imaging lens of high resolution using 5 pieces of lenses have been previously made. Each of the five pieces of lenses is comprised of lenses with positive (+) refractive force and lenses with negative (−) refractive force. For example; the imaging lens is constructed with PNNPN (+−−+−), PNPNN (+−+−−) or PPNPN (++−+−) orderly from an object side. However, an image module of the above-mentioned structure, in some cases, fails to show satisfactory optical properties or aberration properties, and thus a high resolution imaging lens having a new power structure is required.

BRIEF SUMMARY

The present invention provides an imaging lens having a new power structure, in particular provides an imaging lens configured to reduce a flare phenomenon, characteristically decrease the sensitivity and have a superior aberration property.

An imaging lens according to an embodiment of the present invention includes, orderly from an object side, a first lens having positive (+) refractive force; a second lens having negative (−) refractive force; a third lens having positive (+) refractive force; a fourth lens having positive (+) refractive force; and a fifth lens having a negative (−) refractive force, wherein the third lens is convexly formed at the surface of the object side.

In an imaging lens according to the present embodiment, a certain lens is formed in which the first lens, the third lens and the fourth lens have positive (+) power, and the second lens and the fifth lens have negative (−) power, that is, providing an imaging lens of PNPPN power structure.

Also, the third lens is convexly formed at the surface of an object side possibly to realize an imaging lens where the aberration property is superior, a flare phenomenon decreases and the sensitivity is reduced.

BRIEF DESCRIPTION OF THE DRAWINGS

FIG. 3(a) and FIG. 3(b) are a graph showing a coma-aberration according to one embodiment of the present invention;

FIG. 5(a) and FIG. 5(b) are a graph showing a flare phenomenon decreasing property according to the present embodiment.

DETAILED DESCRIPTION

Figure 1:
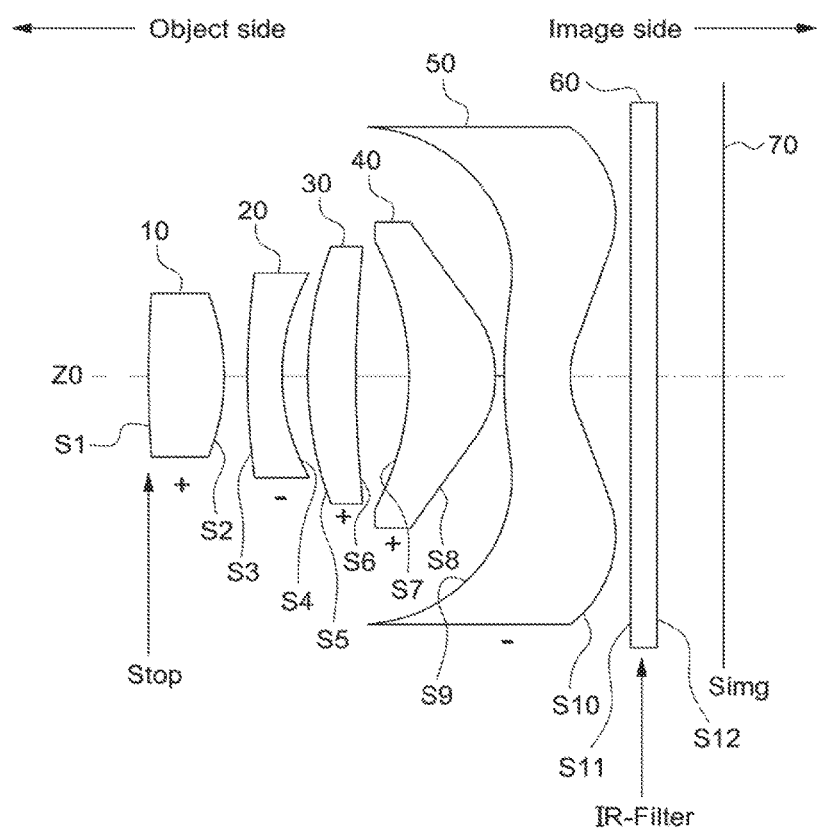
FIG. 1 is a construction view of an imaging lens according to the present embodiment.

Since various changes can be made to the present invention and various kinds of embodiments can be implemented, specific embodiments will be illustrated in the drawings and intended to be described in the detailed description in detail. However, it should not be appreciated in a limiting sense of limiting the present invention to a specific practice but to include all the changes, equivalents and replacements which fall in the spirit and technological scope of the present invention.

Stated that any component "is connected" or "is conjunctive" to another component, it will be appreciated to be directly connected or conjunctive to the very another component or that there exists the other component in the middle.

In the following, referring to attached drawings a preferred embodiment according to the present invention will be described in detail, but without regard to a drawing sign an identical or corresponding component is assigned the same reference numeral and a redundant description of this will be omitted.

FIG. 1 is a construction view according to the present embodiment, and is particularly a lateral construction diagram exemplifying the disposition state of a lens in an optic axis (ZO) center. In the construction view of FIG. 1, the thickness, size and shape of a lens have been somewhat exaggerated for description, and a spherical or aspheric shape is only presented as one embodiment not limiting to such shapes.

Referring to FIG. 1, a camera lens module of the present invention has a construction disposed of a first lens 10, a second lens 20, a third lens 30, a fourth lens 40, a fifth lens 50, a filter 60 and a light-receiving device 70 orderly from the object side.

Light corresponding to image information of a subject passes through the first lens 10, the second lens 20, the third lens 30, the fourth lens 40, the fifth lens 50 and the filter 60 and is incident on the light-receiving device 70.

Hereinafter in the description of the construction of each lens, "Object side surface" means the surface of a lens facing an object side with respect to an optical axis, and "Image side surface" means the surface of the lens facing an imaging surface with respect to the optical axis.

The first lens 10 has positive (+) refractive force, and there is the object side surface S1 convexly formed. The object side surface S1 of the first lens 10 may act as an aperture; and in this case, an imaging lens of the present embodiment does not need a separate aperture. The second lens has negative (−) refractive force, and there is the object side surface S3 convexly formed.

In the third lens 30, the fourth lens 40 and the fifth lens 50, the object side surface and the image side surface are all comprised of an aspheric. (That is, each of object side planes and image side planes in the third lens, the fourth lens and the fifth lens is of aspheric plane.) And, the third lens 30 and the fourth lens 40 have positive (+) refractive force, and the fifth lens has negative (−) refractive force.

As shown in the figure, the third lens 30 is a meniscus form where the object side surface S5 is convexly formed. And, the refractive force of the third lens 30 is formed smaller than the refractive force of the remaining lenses. The object side surface S5 of the third lens 30 is convexly formed, so that as a result a flare phenomenon spreading images decreases and the sensitivity of a lens is reduced.

The fourth lens 40 is a meniscus form in which the object side surface S7 is concavely formed, and the fifth lens 50 is a meniscus form where the object side surface S9 is convexly formed.

Here, the fifth lens 50 is an aspheric shape in which the double-sides of the object side surface S9 and the image side surface S1.0 all have an inflection point. As shown in the figure, the image side surface S10 of the fifth lens 50 bends towards the image side as proceeding from a central part centering an optical axis ZO to the peripheral and again bends to the object side as proceeding from the peripheral part away from the optical axis ZO to the outermost angle region, so as to form an aspheric inflection point.

An aspheric inflection point formed in the fifth lens 50 may adjust the maximum emergence angle of key light incident on a light-receiving device 70. And, an aspheric inflection point formed in the object side surface S9 and the image side surface S10 of the fifth lens 40 adjusts the maximum emergence angle of key light, thereby preventing the shading of the screen's surrounding part.

The filter 60 is at least one filter of optical filters such as an infrared filter and a cover glass. As a filter 60, in the application of the infrared filter, it blocks radiant heat emitting from external light from being transferred to the light-receiving device 70. Also, the infrared filter transmits visible light and reflects infrared rays to output it to the outside.

The light-receiving device 70 is an image sensor, for example, CCD (Charge Coupled Device) or CMOS (Complementary Metal Oxide Semiconductor), etc.

The first lens 10, the second lens 20, the third lens 30, the fourth lens 40 and the fifth lens 50 uses an aspheric lens as later described in embodiments, possibly improving the resolution of a lens and having a good point of superior aberration property.

Because the later described conditional expressions and embodiments are preferred embodiments raising the effect of interaction, it would be obvious to those skilled in the art that the present invention is not necessarily comprised of the following conditions. For example, only by gratifying some conditions of later described conditional expressions, the lens construction of the present invention may have a raised effect of interaction.

$3 < L1R1 < 7$ [Condition 1]

$L3R1 > 1$ [Condition 2]

$L3R2 > 1$ [Condition 3]

$0.5 < f1/f < 1.5$ [Condition 4]

$0.5 < T/f < 1.5$ [Condition 5]

$1.6 < N2 < 1.7$ [Condition 6]

$1.5 < N1, N3, N4, N5 < 1.6$ [Condition 7]

$20 < V2 < 30$ [Condition 8]

$50 < V1, V3, V4, V5 < 60$ [Condition 9]

Herein, L1R1: the object side surface radius of the first lens

L3R1: the object side surface radius of the third lens

L3R2: the imaging side surface of the third lens f: the entire focus distance of the imaging lens f1: the focus distance of the first lens T: the distance from the object side surface to the on-focus surface of the first lens N1~N5: the refractive index of the first lens~the fifth lens V1~V5: Abbe's number of the first lens the fifth lens Condition 1 specifies the curvature radius at the object side surface S1 of the first lens 10, Conditions 2 and 3 specify the double-side curvature radius of the third lens 30. The specification of the curvature radius is conditions on lens's shape, and this is for the compensation of coma aberration and astigmatism and reducing the manufacturing tolerance.

Condition 4 specifies the refractive force of the first lens 10. The first lens 10 has refractive force with appropriate chromatism and the pertinent compensation of spherical aberration by Condition 4. Condition 5 specifies the dimension of the optical axis direction of the entire optical system, and it is a condition for ultra-small lens and a condition for appropriate aberration compensation.

Conditions 6 and 7 specify refractive index of each lens, and Conditions 8 and 9 specify Abbe' number of each lens. The specification of refractive index and Abbe's number of each lens is a condition for better compensation of chromatic aberration.

Hereinafter, the action and effect of the present invention will be described with reference to a specific embodiment. Aspheric mentioned in a later embodiment is obtained from a known Equation 1, and 'E and its succeeding number' used in Conic constant k and aspheric coefficient A, B, C, E, F indicates 10's power. For example, E+01 denotes $10^1$, and E-02 denotes $10^{-2}$.

$$z = \frac{cY^2}{1 + \sqrt{1 - (1+K)c^2Y^2}} + AY^4 + BY^4 + CY^4 + DY^4 + EY^4 + FY^4 + \cdots$$ [Equation 1]

Herein, z: Distance from the lens's top-point to a optical axis direction c: Basic curvature of a lens Y: Distance towards a direction perpendicular to an optical axis K: Conic constant A, B, C, D, E, F: Aspheric coefficient Working Example

TABLE 1

| | Work example |
|---|---|
| F | 4.75 |
| F1 | 4.04 |
| F2 | −4.55 |
| F3 | 9.58 |
| F4 | 3.13 |
| F5 | −3.23 |

TABLE 1-continued

| | Work example |
|---|---|
| F1/f | 0.85 |
| T | 6.73 |
| T/f | 1.42 |
| N1 | 1.533 |
| V1 | 56.5 |
| N2 | 1.62 |
| V2 | 26 |
| N3, N4, N5 | 1.533 |
| V3, V4, V5 | 56.5 |
| L1R1 | 5.60 |
| L3R1 | 3.20 |
| L3R2 | 8.00 |

Table 1 shows a work example matching the aforementioned conditional expression.

Referring to Table 1, L1R1 is 5.60 that shows its matching to Condition 1, and L3R1 is 3.20 and L3R2 is 8.00 that each shows matching into Conditions 2 and 3. Also, f1/f is 0.85 that shows matching into Condition 4, and T/f is 1.42 showing a matching into Condition 5. Also, it can be known that refractive index N1~N5 of each lens matches Conditions 6 and 7, and Abbe's number V1~V5 of each lens matches Conditions 8 and 9.

TABLE 2

| Surface Number | Curvature Radius (R) | Thickness or Distance (d) | Refractive Index (N) |
|---|---|---|---|
| 1* | 5.6 | 0.9 | 1.53 |
| 2* | −3.5 | 0.27 | |
| 3* | 9.4 | 0.40 | 1.61 |
| 4* | 2.1 | 0.30 | |
| 5* | 3.2 | 0.55 | 1.53 |
| 6* | 8.0 | 0.62 | |
| 7* | −2.8 | 1.0 | 1.53 |
| 8* | −1.2 | 0.1 | |
| 9* | 3.4 | 0.78 | 1.53 |
| 10* | 1.1 | 0.70 | |
| 11 | | 0.3 | 1.52 |
| 12 | | 0.80 | |
| image | | 0.01 | |

In the above table 2, the notation * which is further written near the surface number indicates aspheric.

The embodiment of Table 2 shows a more specific embodiment than Table 1's embodiment.

And, the aspheric coefficient values of each lens in the embodiment of Table 2 are as in the following table 3.

TABLE 3

| Surface Number | k | A | B | C | D | E | F |
|---|---|---|---|---|---|---|---|
| 1* | 0 | −0.278840E−01 | −0.115063E−01 | −3.14565E−02 | 0.436500E−02 | −0.364702E−02 | 0 |
| 2* | 0 | −0.691104E−02 | −0.212701E−01 | 0.124050E−01 | −0.861190E−02 | 0.297906E−02 | 0 |
| 3* | 0 | −0.193793E−01 | 0.103822E−02 | −0.133796E−02 | −0.148393E−02 | 0.104056E−02 | 0 |
| 4* | −4.310108 | −0.198769E−01 | 0.309275E−01 | −0.153250E−01 | 0.316803E−02 | −0.164905E−04 | 0 |
| 5* | 0 | −0.508923E−01 | 0.134434E−01 | −0.1118161E−02 | 0 | 0 | 0 |
| 6* | 0 | −0.184251E−01 | 0.197696E−02 | 0.142627E−03 | 0 | 0 | 0 |
| 7* | −8.536520 | −0.287370E−01 | 0.202006E−01 | −0.841387E−02 | 0.244085E−02 | −0.357293E−03 | 0 |
| 8* | −1.771588 | 0.303330E−01 | −0.176527E−01 | 0.367535E−02 | 0.161459E−03 | −0.760293E−04 | 0 |
| 9* | −53.45174 | −0.127200E−02 | −0.878231E−02 | 0.148096E−02 | −0.792305E−05 | −0.165005E−04 | 0.915831E−06 |
| 10* | −5.030395 | −0.213867E−01 | 0.309764E−02 | −0.604438E−03 | 0.690919E−04 | −0.372236E−05 | 0.467587E−07 |

Figure 2:
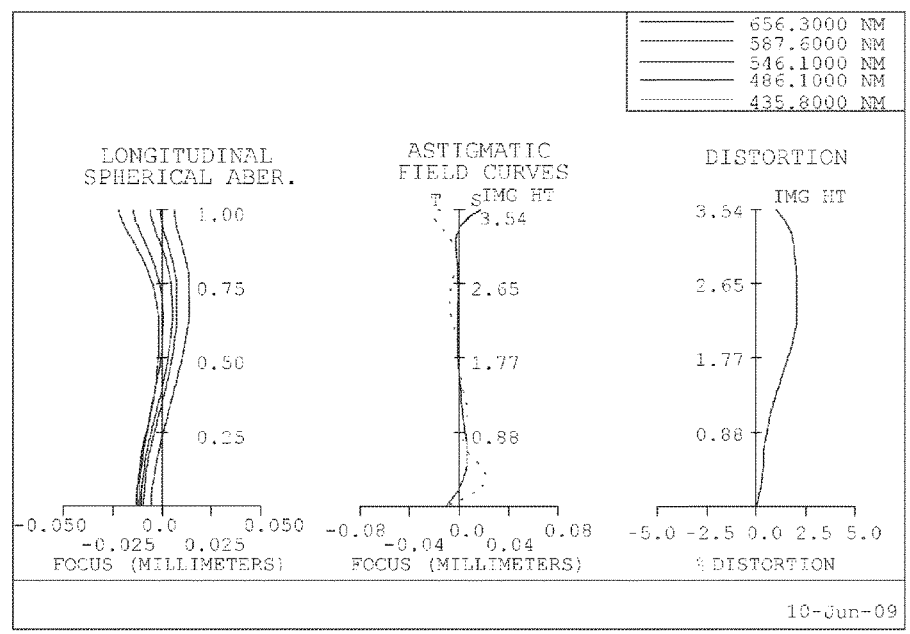
FIG. 2 is a graph showing an aberration property according to one embodiment of the present invention.

FIG. 2 is a graph showing an aberration view according to the aforementioned embodiment, in particular a graph measuring a longitudinal spherical aberration, astigmatic field curves and a distortion in order from the left.

In FIG. 2, the Y axis means the image size, and the X axis means the focus distance (mm unit) and the distortion rate (% unit). In FIG. 2, as the curves approach the Y axis, an aberration compensation function is interpreted to be good. In the shown aberration view, images' values on almost all the fields appear adjacent to the Y axis, so that the longitudinal spherical aberration, the astigmatic field curves and the distortion all show superior numerical values.

FIG. 3 is a graph measuring Coma aberration, and FIGS. 3(a) and 3(b) is a graph measuring tangential aberration and sagittal aberration of each wavelength according to a field height. In FIG. 3, In FIG. 3, as a graph showing a test result approaches the X axis from the positive axis and the negative axis each, a coma aberration compensation function is interpreted to be good. In the FIG. 3's measurement examples, image values on almost all the fields appear adjacent to the X axis, so that all of them are analyzed to show a superior coma aberration compensation function.

Figure 4:
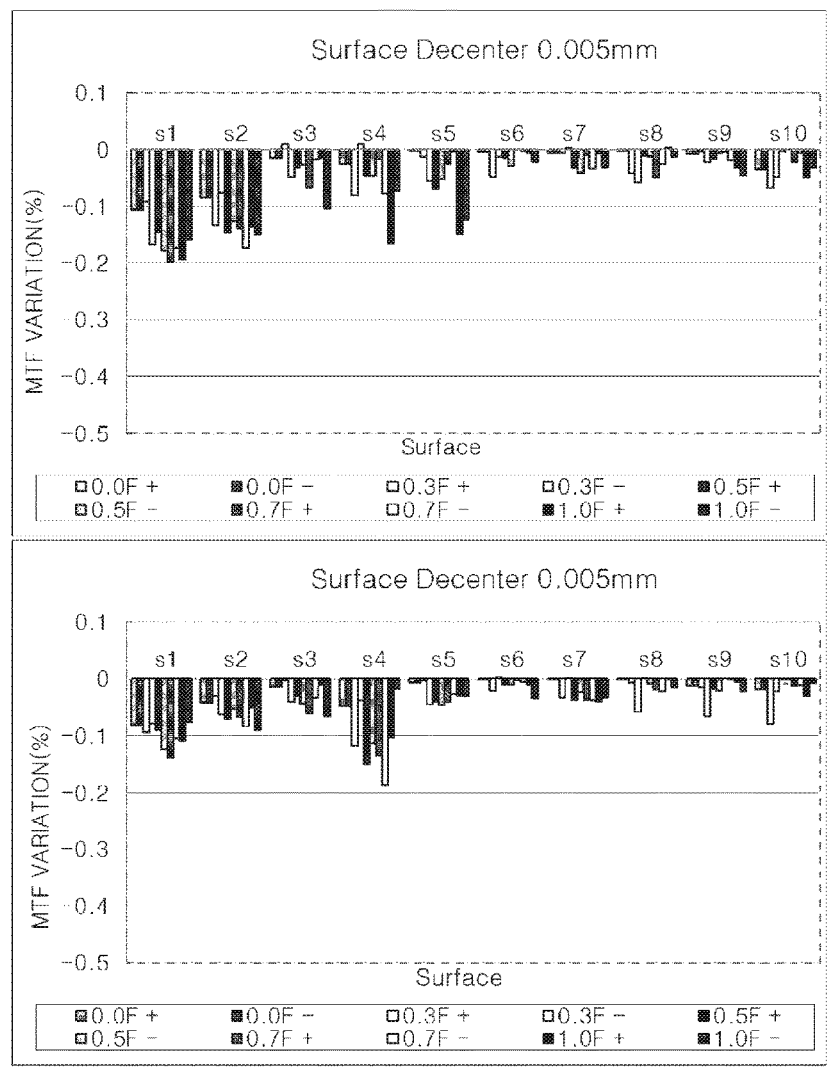
FIG. 4 is a graph showing a sensitivity decrease property according to the present embodiment.

FIG. 4 is a graph showing a sensitivity decrease feature as a result of the present embodiment, and FIG. 5(a) and FIG. 5(b) are a view showing a flare phenomenon reduction feature according to the present embodiment. In FIG. 4, FIG. 5(a) and FIG. 5(b), to show the sensitivity decrease and the reduction of a flare phenomenon by bulgingly forming the object side surface S5 of the third lens 30 in the present invention, a case of concavely forming the object side surface S5 of the third lens 30 and a case of convexly forming the same are exemplified in comparison to each other.

FIG. 4a shows a tolerance analysis in a lens plane when the object side S5 of the third lens 30 is concave, and FIG. 4b shows a tolerance analysis in the lens plane when the object side S5 of the third lens 30 is convex. Comparing the two views, it can be known that the change in resolution (MTF; Modulation Transfer Function) at FIG. 4b is smaller than FIG. 4a. That is, when the third lens 30 has a meniscus form in which the object side surface S5 is convex, it clearly causes the further decrease of its sensitivity than in a concave form of the object side surface of the third lens 30.

FIG. 5(a) shows an example of ray distribution in an image sensor where the object side surface S5 of the third lens 30 is concave, and FIG. 5(h) shows an example of ray distribution in the image sensor when the object side surface S5 of the third lens 30 is convex. Comparing the two views, the ray distribution at FIG. 5(b) is well dispersed than in FIG. 5(a), and thus, to be sure, a ghost phenomenon or a flare phenomenon, in which an image non-existent in a subject is formed when the object side surface of the third lens 30 is in a convex shape like the present invention, is greatly decreased.

While the embodiments of the present invention has been explained in detail at the foregoing part, the rights scope of the present invention is not limited to the embodiment and various modifications and substitutions thereto by those skilled in the art using the basic concept of the present invention as defined in the accompanying claims will fall in the rights scope of the invention.

What is claimed is:

1. An imaging lens system, comprising, in order from an object side to an image side:
   a first lens having positive (+) refractive power;
   a second lens having negative (−) refractive power;
   a third lens having positive (+) refractive power;
   a fourth lens having positive (+) refractive power; and
   a fifth lens having negative (−) refractive power,
   wherein an image side surface of the third lens is concavely formed, and
   wherein an object side surface of the second lens is convexly formed.

2. The imaging lens system of claim 1, wherein a curvature radius of the image side surface of the third lens is positive.

3. The imaging lens system of claim 2, wherein a curvature radius of the object side surface of the third lens is positive.

4. The imaging lens system of claim 1, wherein both an object side surface and an image side surface of the first lens are convexly formed.

5. The imaging lens system of claim 1,
   wherein an image side surface of the second lens is concavely formed.

6. The imaging lens system of claim 1, wherein an object side surface of the fifth lens is convexly formed at an optical axis of the imaging lens system.

7. The imaging lens system of claim 1, wherein an image side surface of the fifth lens is concavely formed at an optical axis of the imaging lens system.

8. A camera module comprising an imaging lens system and an image sensor, wherein the imaging lens system comprises, in order from an object side to an image side:
   a first lens having positive (+) refractive power;
   a second lens having negative (−) refractive power;
   a third lens having positive (+) refractive power;
   a fourth lens having positive (+) refractive power; and
   a fifth lens having negative (−) refractive power,
   wherein an image side surface of the third lens is concavely formed, and
   wherein an object side surface of the second lens is convexly formed.

9. An imaging lens system, comprising, in order from an object side to an image side:
   a first lens having positive (+) refractive power;
   a second lens having negative (−) refractive power;
   a third lens having positive (+) refractive power;
   a fourth lens having positive (+) refractive power; and
   a fifth lens having negative (−) refractive power,
   wherein an image side surface of the third lens is concavely formed at an optical axis of the imaging lens system, and
   wherein an object side surface of the second lens is convexly formed.

10. The imaging lens system of claim 9, wherein an object side surface of the fourth lens is concavely formed at the optical axis of the imaging lens system.

11. The imaging lens system of claim 9, wherein a curvature radius of the image side surface of the fourth lens is negative at the optical axis of the imaging lens system.

12. The imaging lens system of claim 9, wherein a curvature radius of the object side surface of the fourth lens is negative at the optical axis of the imaging lens system.

13. The imaging lens system of claim 9, wherein the third lens has a meniscus shape convexly formed to the image side.

14. The imaging lens system of claim 9, wherein both an object side surface and an image side surface of the first lens are convexly formed.

15. The imaging lens system of claim 9, wherein an image side surface of the fourth lens is convexly formed at an optical axis of the imaging lens system.

16. The imaging lens system of claim 9, wherein an image side surface of the second lens is concavely formed, and
   wherein an object side surface of the fifth lens is convexly formed at an optical axis of the imaging lens system.

17. The imaging lens system of claim 9, wherein an image side surface of the fifth lens is concavely formed at an optical axis of the imaging lens system.

18. A camera module comprising an imaging lens system and an image sensor, wherein the imaging lens system comprising, in order from an object side to an image side:
   a first lens having positive (+) refractive power;
   a second lens having negative (−) refractive power;
   a third lens having positive (+) refractive power;
   a fourth lens having positive (+) refractive power; and
   a fifth lens having negative (−) refractive power,
   wherein an image side surface of the third lens is concavely formed at an optical axis of the imaging lens system, and
   wherein an object side surface of the second lens is convexly formed.

19. An imaging lens system, comprising, in order from an object side to an image side:
   a first lens having positive (+) refractive power;
   a second lens having negative (−) refractive power;
   a third lens having positive (+) refractive power;
   a fourth lens having positive (+) refractive power; and
   a fifth lens having negative (−) refractive power,
   wherein an image side surface of the third lens is concavely formed, and
   wherein an object side surface of the fifth lens comprises an inflection point.

20. An imaging lens system, comprising, in order from an object side to an image side:
   a first lens having positive (+) refractive power;
   a second lens having negative (−) refractive power;
   a third lens having positive (+) refractive power;
   a fourth lens having positive (+) refractive power; and
   a fifth lens having negative (−) refractive power,
   wherein an image side surface of the fourth lens is convexly formed, and
   wherein an object side surface of the fifth lens comprises an inflection point.

* * * * *